(12) United States Patent
Cichonski

(10) Patent No.: US 12,245,559 B2
(45) Date of Patent: Mar. 11, 2025

(54) PLANT CULTIVATION COLUMN ASSEMBLY WITH OPENABLE VENTS AND METHODS OF USE

(71) Applicant: Tyler Cichonski, Atlanta, GA (US)

(72) Inventor: Tyler Cichonski, Atlanta, GA (US)

( * ) Notice: Subject to any disclaimer, the term of this patent is extended or adjusted under 35 U.S.C. 154(b) by 0 days.

(21) Appl. No.: 18/347,521

(22) Filed: Jul. 5, 2023

(65) Prior Publication Data
US 2024/0008420 A1    Jan. 11, 2024

Related U.S. Application Data

(60) Provisional application No. 63/367,688, filed on Jul. 5, 2022.

(51) Int. Cl.
*A01G 9/12*   (2006.01)
*A01G 9/02*   (2018.01)

(52) U.S. Cl.
CPC ............ *A01G 9/022* (2013.01); *A01G 9/026* (2013.01); *A01G 9/12* (2013.01)

(58) Field of Classification Search
CPC ...... A01G 9/12; A01G 9/122; A01G 13/0243; A01G 2013/046; B65F 2220/102; B65F 2220/106; B65F 2230/148
See application file for complete search history.

(56) References Cited

U.S. PATENT DOCUMENTS

| | | | |
|---|---|---|---|
| 4,106,233 A * | 8/1978 | Horowitz | A01G 9/122 403/339 |
| 5,471,783 A * | 12/1995 | McLean | A01G 13/0243 229/4.5 |
| 6,088,952 A * | 7/2000 | Wilson | A01G 13/0243 47/30 |
| D1,014,206 S * | 2/2024 | Chen | D8/1 |
| 2023/0309463 A1 * | 10/2023 | Chen | A01G 9/12 47/46 |

FOREIGN PATENT DOCUMENTS

| | | | | |
|---|---|---|---|---|
| AU | 715622 B | * | 2/2000 | ......... A01G 13/0243 |
| EP | 2532225 A1 | * | 12/2012 | ......... A01G 13/0243 |

* cited by examiner

*Primary Examiner* — Kristen C Hayes
(74) *Attorney, Agent, or Firm* — Richard C. Piercy, Esq.; Grell & Watson Patent Attorneys LLC

(57) ABSTRACT

A plant cultivation column assembly. The assembly provides a vertical structure to contain one or more plants and surrounding growing medium and allows for sufficient aeration, vapor exchange, and facilitates plant reconfiguration. The assembly includes a flexible sheet with slatted projections on opposing edges. The slatted projections alternate to connect to the opposing edges via detachable connections. The assembly is designed to allow for easy assembly and disassembly, minimizing disturbance to the planting medium and plant and additionally allowing the plant to naturally project from openings formed between the slatted projections. The structure offers a large surface area for vapor and air exchange, promoting optimal plant growth. Additionally, the assembly can accommodate various plants and planting mediums, and may be used with additional stabilizing structures, subsequently joined assemblies into a taller column/structure, and/or pots and potted bases. Methods of assembly and use of the plant cultivation column assembly.

18 Claims, 5 Drawing Sheets

PLANT CULTIVATION COLUMN ASSEMBLY WITH OPENABLE VENTS AND METHODS OF USE

CROSS-REFERENCE TO RELATED APPLICATIONS

To the full extent permitted by law, the present United States Non-Provisional patent application hereby claims priority to and the full benefit of, United States Provisional Application entitled "Vertical Plant Pot with Openable Mesh and Vents," having assigned Ser. No. 63/367,688, filed on Jul. 5, 2022, which is incorporated herein by reference in its entirety.

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE DISCLOSURE

Technical Field of the Disclosure

The instant disclosure relates generally to an assembly of a column structure to provide a system for the vertical cultivation of plants. Specifically, the disclosure relates to such an assembly with predominant openings formed via a connection means such that disassembly can occur without risking damage to any natural structures and living organisms growing therein.

Description of the Related Art

Plant cultivation, and specifically home indoor plant cultivation, has existed for much of human history. In fact, much evidence of early human civilization may have been recovered thanks to preserved pottery, some of which may have once housed indoor or outdoor cultivated plants. Though plants may naturally grow outdoors in grounded soil, and may be cultivated within such grounded soil, humans have long sought to enable the safe transport of cultivated plants for numerous reasons. This has traditionally meant potting plants into a soil, soil-like medium, or other cultivation medium, and providing sufficient water, light, and nutrients to the plants such that they can grow within the pot and/or pottery. Whether due to a new trend of "urban farming" or due to the desire to introduce new and interesting planting structures into the home, vertical plant cultivation has become a popular hobby with even some agricultural industry developments and implementations at such industrial and/or commercially relevant scales. This may be due to the fact that vertical planting and plant cultivation can be accomplished at a greater square-footage efficiency and may provide more aesthetically pleasing and otherwise more visually interesting and/or unique decorations within many smaller, more urban homes. Agriculture within urbanized areas may further benefit from such vertical cultivation because industrial and commercial real estate within cities may demand increased use efficiency (i.e., highest and best use market and economic forces), due to these same factors. Innovations in lighting technology may also be responsible for the increased popularity of such cultivation techniques, in that sufficient indoor lighting can be introduced in areas where sufficient lighting for healthy plant growth would have otherwise been impossible/impractical.

In the case of certain plants which may benefit from aeroponic-type and other vertical plant systems, plants may be fixed into a pot or base, and then provided sufficient vertical structure to surround various planting medium which may receive water, air, and nutrients to induce or otherwise provide area for growth of roots and other plant structures. Various vertical structures have been developed and may be known to those having ordinary skill in the art. These devices may generally include rigid structures and meshes which may allow air and vapor exchange between the growing medium and surrounding environment. The rigid structures may be poles or other strong and tall components which may be buried or fastened to the base of the assembly. The mesh may be any material which may provide sufficient gas/vapor exchange with the surrounding environment as may be known to those having ordinary skill in the art. In such assemblies, the mesh(es) may be wrapped around or otherwise attached to the rigid structures to form a vertical column, the column to be filled with the appropriate cultivation medium, which may in turn be watered and/or nutrient supplemented according to a schedule and/or procedure which may be known to those having ordinary skill in the art. While such structures may offer sufficient indoor environment to provide beneficial plant cultivation, they may often be aesthetically unpleasing, complicated, unwieldy, unstable, and/or expensive. Additionally, should rearrangement, replanting, or other modifications to the structure be needed, these assemblies may require full disassembly and/or destruction or may otherwise harm growing plants during such procedures.

Newer innovations in vertical plant cultivation techniques may include designs that utilize flat transparent plastic sheets. Such sheets may be capable of folding or bending to form a cylindrical or other shaped column, may be drilled, cut, or otherwise manufactured to include gas/vapor exchange apertures, and may provide sufficient vertical strength to provide both the mesh and pole structures from a single piece of cut plastic, which may enable the assembly of towers/columns for vertical plant cultivation in various convenient, uncomplicated, inexpensive, and visually appealing designs. These designs further may often incorporate openings of various sizes to facilitate air and moisture exchange between the soil medium contained within the column and the environment thereabout. These designs may further include features which enable the closing of the sheet into the cylindrical column and/or open polyhedral column structure, such means as known in the art. These may include snaps, buttons, zippers, hook-and-loop fasteners, adhesives, welding, and tabs which may interlock with slits and/or corresponding apertures. While flat transparent plastic sheets may be offered in many possible formulations to include many hole/aperture designs/patterns, fastening means, and overall shape/structure, they may still lack the ability to easily disassemble all or a portion of the corresponding column to perform various procedures upon the planted structure as may be outlined above. Such existing solutions often require disassembling or dismantling the entire structure, leading to inconvenience and potential harm to the plants. Furthermore, some designs may further require threading developed roots or developed leaf structures through openings for removal, which may cause damage to the corresponding plant structure, or may alternatively or optionally require the cutting and/or destruction of the cultivation structure to prevent such damage to the plant.

Certain various other vertical plant cultivation columns, devices, and accessories may offer compartmentalized structures and/or openings to house one or more plants within such a column. However, as it is the nature of plants to grow root structures within a soil or planting medium, such root structures may often grow beyond such a compartmentalized structure and into the surrounding medium contained therein, also restricting the ability to replant and/or reconfigure the plant upon a certain threshold of plant root growth. Removal thereof may require a choice between a risk to damaging the plant or the certainty of destroying the column to save such a plant.

Of those simple, unitary constructions currently available to vertical plant growers in the current marketplace, none known offer the ability to provide small openings which may be capable of aeration/vapor exchange without encouraging plant anatomical growth and/or projection therefrom the construction while simultaneously offering detachable mechanisms to constcust such a simple device to form more predominant openings, which can allow for additional aeration/vapor exchange capability and perhaps more importantly, the encouragement of plant growth therefrom the predominant openings which can then be easily disassembled/rearranged subsequent to assembly and plant growth to enable reconfiguration and/or removal of plant position.

Therefore, it is readily apparent that there is a recognized unmet need for plant cultivation column assembly and method of use which can be easily manufactured, assembled, allowed to cultivate plants, and be disassembled, repositioned, and reassembled without risking potential damage to the plant and anatomical structures thereof during such activities. The instant disclosure is designed to address this need through an assembly, manufacture, and methods of use, which includes a specialized flexible sheet capable of assembly into a plant cultivation column assembly and method of use disclosed herein while addressing at least some of the aspects of the problems discussed above.

SUMMARY

Briefly described, in a possibly preferred embodiment, the present disclosure overcomes the above-mentioned disadvantages and meets the recognized need for such a plant cultivation column assembly by providing an improved structure for the planting, growing, maintenance, and/or cultivation for one or more plants. The assembly may connect or be installed within or about a potted base and may contain a plant and/or growing medium. Such an embodiment may be constructed of a unitary flexible sheet having a plurality of slatted projections formed from two opposing edges thereof, the slatted projections having connection means to each corresponding opposing edge. It may be constructed of a suitable flexible material which may be preferably transparent plastic, such as polyethylene, and may be die cut from an ordinary sheet of the same to form such structures and/or features as are herein disclosed. When assembled, the assembly may include a continuous wall with opposing left and right linking walls. The continuous wall may be bent and/or curved and have small and/or minor openings and the left and right linking walls, which may be linked via the opposing slats, may form a predominantly flat wall having predominant openings therebetween the slats. Each slat may have connection means to the opposing edge, which may be detachable connection means in order to allow for the assembly and disassembly of the column structure from the corresponding sheet.

In certain select and/or potentially optimal embodiments of the disclosed plant cultivation column assembly, the flexible sheet may be scored vertically along and parallel to the opposing edges to allow for a crease in order to form the opposing left and right linking walls. Such scoring and creasing may increase the overall sturdiness of the corresponding assembly as well as enable the uniform construction thereof to facilitate the combination, i.e., stacking, of such column assemblies, which may be joined via simple constriction or additionally adhered or connected via any number of means as may be known to those having ordinary skill in the art. The continuous wall may have none, one, or a plurality of small openings which may provide sufficient aeration/vapor exchange properties with the surrounding environment, but may potentially preferably restrict the ability of a plant contained therein to project anatomical structures therefrom, thereby ensuring the continued ease of removal of the column from the plant, or vice versa, without risk of or at least minimizing risk of damaging the plant during such activities. The predominant openings formed between the connected slats of the assembly may encourage and/or enable such growth of anatomical plant structures therefrom the assembly, but the detachable connections may further enable the ease by which removal/adjustment of such structures and the overall plant, as may be necessary or desired. Such slats may be connected to such opposing faces via many number of connection means, which may include the potentially optimally simple means of a widened tab formed distally from each corresponding slat and a correspondingly narrower aperture, slit, or opening at the opposing side face/wall. Such slats may then be joined to such faces via simply bending the widened tab, pushing through the opposing aperture, and releasing the slat. Such steps may be completed across multiple or all slat, tab, and aperture combinations to provide sufficient structure to contain both planting medium and a growing plant therein.

Various alternate embodiments of various features of the disclosed plant cultivation column assembly may be relevant to those skilled artisans practicing the assembly and methods of use of the disclosure and be detailed more thoroughly below. Those may include alternative connection means which may offer certain benefits and/or tradeoffs. These may include connections such as buttons, magnets, snaps, and hook and loop fasteners, and/or others as may be detailed below and known to those having ordinary skill in the art. While a transparent plastic sheet construction may be potentially preferred, other suitable materials for construction may also be provided. One potentially preferred column shape/structure may be identified herein, but many possible shapes are contemplated and described herein. Additional accessories devices may also enhance the overall utility and use of plant cultivation column assembly. Such accessories may include potted bases, connections thereto, specialized supporting structures, lids, as well as various other accessories as may be further detailed below.

These and other features of the disclosed plant cultivation column assembly and method of use will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The disclosed plant cultivation column assembly and method of use will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in FIGS. 1-5, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples. It should be noted that the terms sheet(s), plastic sheet(s), transparent plastic sheet(s), planter(s), column(s), vertical column(s), construction(s), and/or assembly(ies) may be used herein interchangeably as descriptors for any suitable structure, sheet, or assembly having the features as may be described herein. The various plants of interest for a plant cultivation column assembly are not limited to the examples as may be provided herein, nor is the description limited to any planter, pot, planting medium, soil, watering/aeration technique, and/or structural assembly. A potentially preferred embodiment of a plant cultivation column assembly of the disclosure may be provided throughout, though one having ordinary skill in the art may substitute and/or reconfigure various aspects of the assembly and/or provide alternative methods of use for the construction/assembly. The disclosure is not limited to any specific configuration of the plant cultivation column assembly as herein illustrated or described, but only by the corresponding claims. The term plant, as used herein, shall mean any living or dead photosynthetic multicellular organism or any synthetically produced/manufactured replica and/or substitute thereof.

Figure 1:
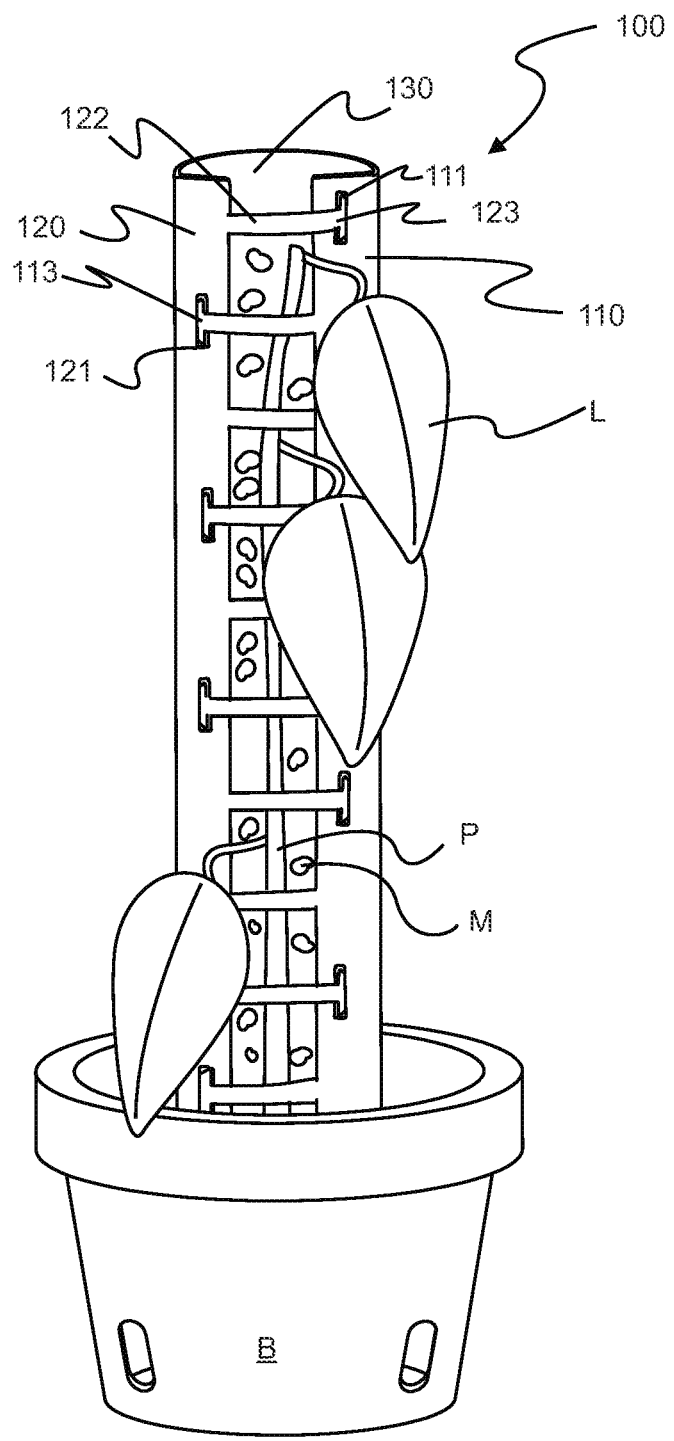
FIG. 1 is a perspective drawing of a potentially preferred embodiment of the plant cultivation column assembly of the disclosure.

Referring now to FIG. 1 by way of example, and not limitation, therein illustrated is a perspective drawing of a potentially preferred embodiment of plant cultivation column assembly 100 of the disclosure. As illustrated therein, various features of plant cultivation column assembly 100 may generally include continuous wall 130 facing opposing left linking wall 120 and right linking wall 110. Left slat 122 may protrude from left linking wall 120 and right slat 112 right linking wall 110, or a plurality thereof left slat 122 and right slat 112 may protrude therefrom as illustrated therein FIG. 1. Extending from left slat 122 and right slat 112 may be left connection means 123 and right connection means 113, respectively, as well as a plurality thereof left connection means 123 and right connection means 113, as may be appropriate, given the corresponding plurality of left slat 122 and right slat 112. Left aperture 121 may form on left linking wall 120 opposite a corresponding right slat 112 and similarly, right aperture 111 may form on right linking wall 110 opposite corresponding left slat 122, and plurality thereof each of the groups thereof the slat/connection means combination and aperture may appear to alternate along the vertical structures of left linking wall 120 and right linking wall 110, as may be more readily apparent from a review of FIG. 2 and the below relevant description thereof. When assembled into plant cultivation column assembly 100, each of any plurality of left connection means 123 may be inserted into right linking wall 110 at each corresponding right aperture 111 and each of any plurality of right connection means 113 may be inserted into left linking wall 120 at each corresponding left aperture 121, thereby forming an opening at the face of the structure/assembly formed thereof plant cultivation column assembly 100. Prior to, during, or after assembly of plant cultivation column assembly 100, plant P may be inserted into the hollow column formed within plant cultivation column assembly 100, said hollow column may be filled with planting medium M, and one or more leaf L may be placed through the openings of the face of plant cultivation column assembly 100. Plant cultivation column assembly 100 may be fully and/or partially assembled prior to such steps, as may be further detailed in connection with FIG. 5, and such steps may be reversed and/or repeated to fully assemble plant cultivation column assembly 100 to house plant P having leaf L and surrounded by planting medium M. Additionally, potted base B, or any other structure, pot, surface, or other known method of housing such plant cultivation column assembly 100 may be utilized to provide additional stability, support, decoration, or structure during use, cultivation, and/or display. As may be recognized by those having ordinary skill in the art, the formation of openings between various left slat 122 and right slat 112 may provide sufficient structure to support and/or contain both plant P and planting medium M, while also offering the benefits of large surface area for vapor/air exchange as may be necessary/beneficial for the cultivation of various plants as may be known to those having ordinary skill in the art. In addition to providing such a large surface area for the exchange of vapor, moisture, and gases, these openings may further provide useful and/or beneficial during reconfiguration, assembly, disassembly, or other various reasons, such that planting medium M may be minimally disturbed and plant P having one or more leaf L may similarly be minimally harmed during such reconfiguration, assembly, and/or disassembly of plant cultivation column assembly 100. Other useful features of plant cultivation column assembly 100 may be recognized and described below in relation to, e.g., FIGS. 2-5 and the detailed description thereof.

Figure 2:
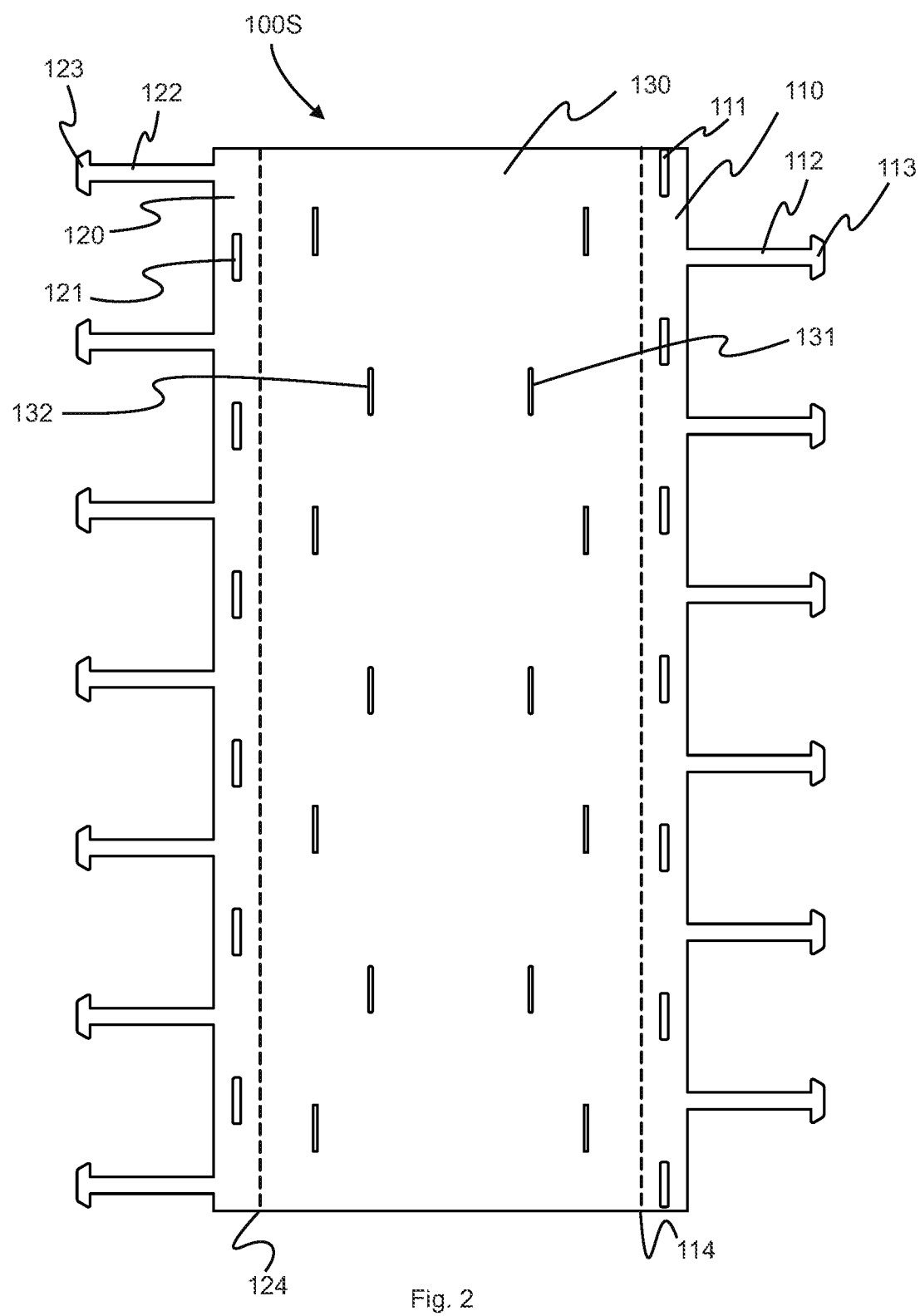
FIG. 2 is a plan drawing thereof prior to such assembly.

Referring now to FIG. 2, therein illustrated is a plan drawing of a potentially preferred embodiment of plant cultivation column assembly 100 prior to such assembly, or as may be alternatively understood as disassembled/flattened as sheet 100S. Sheet 100S may be understood to be illustrated to broadly include continuous wall 130 having opposed left linking wall 120 and right linking wall 110 about each corresponding left and right side, respectively. Continuous wall 130 may extend from left score 124 rightward to right score 114 and may include one or more of small aeration pore (left) 132, small aeration pore (right) 131, and/or a plurality thereof as may be illustrated in FIGS. 2-3 and as may be preferred to optimize aeration capabilities of plant cultivation column assembly 100 in use as may be known/preferred to those having ordinary skill in the art. Size, shape, and quantity of small aeration pore (left) 132 and/or small aeration pore (right) 131 and pluralities thereof may vary upon certain features and benefits, including but not limited to surface area requirements and/or overall structural stability of plant cultivation column assembly 100. Protruding from each of left linking wall 120 and right linking wall 110, and opposing continuous wall 130, may be one or more (i.e., a plurality) of each of left slat 122 and right slat 112. Upon each of left linking wall 120 and right linking wall 110 may be one or more (i.e., a plurality) of each of left aperture 121 and right aperture 111, which may each be located opposite a corresponding right slat 112 and left slat 122, respectively, and/or between one or more left slat 122 or right slat 112, respectively. Alternatively, as may be best understood as that aperture labeled right aperture 111, such aperture(s) may be placed between right slat 112 and the top end of right linking wall 110. For the sake of simplicity of description, only one of such left slat 122, right slat 112, left aperture 121, right aperture 111, left connection means 123, and right connection means 113 are numbered, though many may be illustrated and herein described. In such a potentially preferred embodiment of sheet 100S as may be illustrated herein FIG. 2, left linking wall 120 may feature seven (7) corresponding slats, seven (7) connection means, and six (6) apertures and right linking wall 110 may feature six (6) corresponding slats, six (6) connection means, and seven (7) apertures and each slat/connection means combination may vertically oppose each aperture, as may be visibly recognized therein FIG. 2 by one having ordinary skill in the art. Such a skilled artisan may adjust such quantities of slats, their connection means, and their opposing apertures to accomplish various heights, spacing, etc. Each of left connection means 123 and right connection means 113 may be optimally configured to be slightly larger than any corresponding left aperture 121, right aperture 111, left slat 122, and right slat 112, such that in a potentially preferred embodiment constructed of clear, flexible, but somewhat rigid plastic materials, or variations thereof as may be herein described, each left connection means 123 and/or right connection means 113 may be bent to protrude into each corresponding left aperture 121 and/or right aperture 111 and allowed to return to a flattened shape, thus enabling one such securing means among others which may be either known to those having ordinary skill in the art or otherwise herein described. Such alternative connection/securing means may include, but are not limited to, buttons, snaps, magnets, hook-and-loop fasteners (e.g., VELCRO®), tape, adhesives, welding(s), zipper(s), the like and/or combinations thereof, and may correspondingly vary in size, structure, and/or assembly as may be understood by those having ordinary skill in the art to be required to implement such alternative connection/securing means. In certain preferred embodiments, such connections means may be preferably detachably connectable to enable certain features/benefits as may be herein described. Additionally, in such preferred embodiment of right aperture 111 and left aperture 121 and pluralities thereof, each may be constructed as narrow, long holes and/or understood to be slits formed in sheet 100S as may be located along left linking wall 120 and/or right linking wall 110, respectively. Certain other benefits of sheet 100S as may be formed into plant cultivation column assembly 100 may be additionally understood by those having skill in the art through review of the remaining FIGS. 3-5, as well as the corresponding Detailed Description below.

Figure 3:
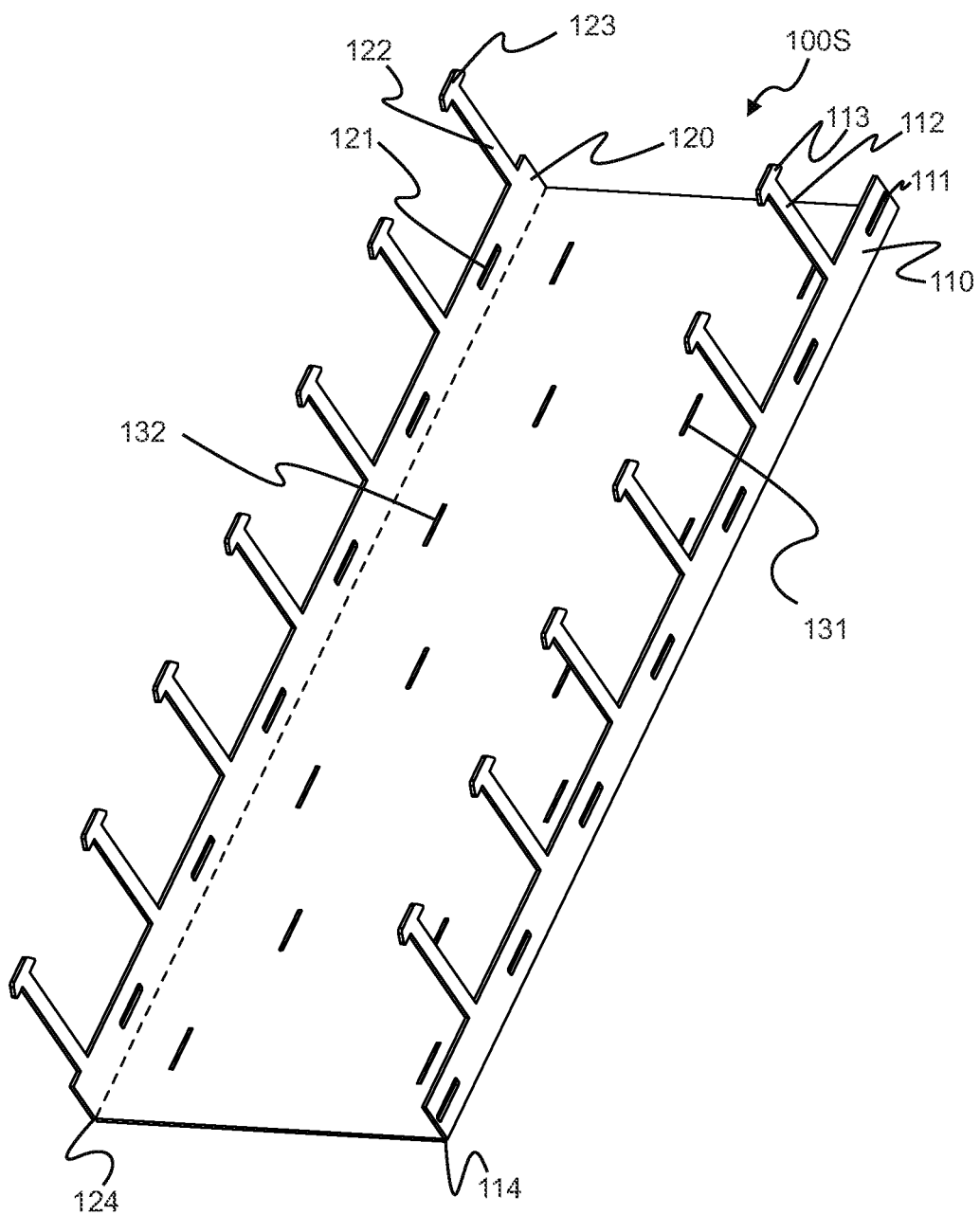
FIG. 3 is a perspective drawing thereof during such assembly.

Turning to FIG. 3, illustrated therein is a perspective drawing of sheet S during a potentially preferred first step to complete plant cultivation column assembly 100. The same various features of sheet 100S, including continuous wall 130 (including a plurality of small aeration pore (left) 132 and small aeration pore (right) 131), left linking wall 120 (including a plurality of left aperture 121), right linking wall 110 (including a plurality of right aperture 111), and pluralities of left slat 122 and right slat 112 extending respectively therefrom and further including left connection means 123 and right connection means 113 further extending respectively therefrom are therein illustrated, the above description of which may be further detailed. Additionally, as may be important to such a potentially preferred intermediate assembly step, the importance of left score 124 and right score 114 may be further realized by those having ordinary skill in the art. In such configurations and potentially preferred intermediate assembly step(s), sheet 100S may be folded at each of left score 124 and right score 114 and further creased to provide such shape and construction of plant cultivation column assembly 100 when assembly, as may be better understood upon review of FIGS. 1 and 4 and therein described. Then, it may be realized that connections between left linking wall 120 and right linking wall 110 by way of left slat 122 and left connection means 123 into right aperture 111 as well as right slat 112 and right connection means 113 into left aperture 121 may form, or proceed to form, plant cultivation column assembly 100 from sheet S. As may be understood by those having ordinary skill in the art, certain potentially preferred methods of assembly, as may be further described in relation to FIG. 5, may include assembly of the most vertically distal of one or more slats (i.e., those closest to the proposed top and bottom of sheet 100S) into their corresponding aperture, followed by assembly of one or more of those most vertically proximally disposed slats into the corresponding apertures, and additionally followed by assembling the remaining slats and corresponding apertures thereof, may optimally arrange and provide the most convenient assembly of plant cultivation column assembly 100. Additionally, such potentially preferred means and methods/steps of assembly may further enable the insertion of plant P into plant cultivation column assembly 100 as well as the threading or of any leaf L, which may protrude from plant cultivation column assembly 100 from the openings therein formed. Finally, in such potentially preferred intermediate assembly step(s) as may be illustrated therein FIG. 3, the overall shape of plant cultivation column assembly 100 may then form a semi-cylindrical column, which may offer certain structural, aeration, and assembly/disassembly benefits, as may be relevant and recognized by those having ordinary skill in the art. Further features and benefits, including the final assembly of plant cultivation column assembly 100, the linking of parts thereof, and steps to achieve the features and benefits as herein described may be recognized through a review of FIGS. 4-5, as well as the remaining Detailed Description herein and related thereto.

Figure 4:
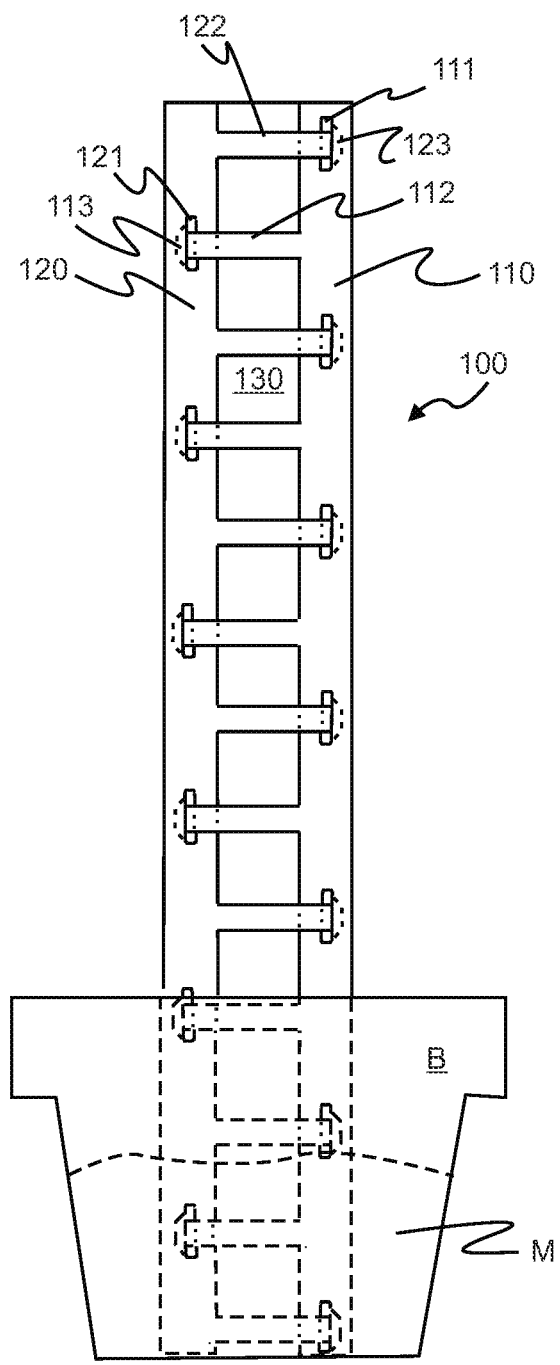
FIG. 4 is a transparent elevation drawing of the potentially preferred embodiment of the plant cultivation column assembly.

Now turning to FIG. 4, therein illustrated and herein described is a transparent elevation drawing of the potentially preferred embodiment of plant cultivation column assembly 100. The same various features of plant cultivation column assembly 100, including continuous wall 130 (including a plurality of small aeration pore (left) 132 and small aeration pore (right) 131, which may be obscured or omitted from FIG. 4—see, e.g., FIGS. 1-3), left linking wall 120 (including a plurality of left aperture 121), right linking wall 110 (including a plurality of right aperture 111), and pluralities of left slat 122 and right slat 112 extending respectively therefrom and further including left connection means 123 and right connection means 113 further extending respectively therefrom are therein illustrated, the above description of which may be further detailed supra. Features of plant cultivation column assembly 100 which may be further evident by those having ordinary skill in the art may include at least the potentially preferred configuration therebetween the plurality of left aperture 121 on left linking wall 120 and the plurality of right connection means 113 as well as the potentially preferred configuration therebetween the plurality of right aperture 111 on right aperture 111 and the plurality of left connection means 123, in addition to the configuration of corresponding slats of the same. As may be apparent to those having ordinary skill in the art from a close review of FIG. 4, subsequent to the folding step which may be further examined via FIG. 3 and the corresponding description, continuous wall 130 may be bent or curved such that each left slat 122 may be pulled to meet each right aperture 111 at each corresponding left connection means 123. Then, each left slat 122 may overlap a portion of right linking wall 110 in order to temporarily hold continuous wall 130 in its bent and/or curved position, especially when, in a potentially preferred exemplary embodiment of a method of use of plant cultivation column assembly 100, one or more left slat 122 is held to in front of right linking wall 110 or the user pinches the same between, for example, their finger and thumb. Then, a first left connection means 123 may be placed through its corresponding/opposite right aperture 111, which may be held proximate in such a potentially preferred configuration. This process may be repeated via the remaining left slat 122, right aperture 111, and left connection means 123 and by similarly holding one or more right slat 112 to the left aperture 121 proximate portion of left linking wall 120 and placing the corresponding right connection means 113 or plurality thereof through the corresponding left aperture 121 or plurality thereof. One potentially optimal order of connection may be to first join a slat proximate to the top and/or bottom to either or both of right linking wall 110 and left linking wall 120, then joining one or more centrally located slat to either or both of right linking wall 110 and left linking wall 120, and completing the assembly by joining the remaining slats to the corresponding/opposite linking wall. During various steps of such assembly of plant cultivation column assembly 100, planting medium M may be added and plant P may be inserted into plant cultivation column assembly 100. Additionally, as illustrated and perhaps readily apparent herein FIG. 4, potted base B may be filled partially or completely with planting medium M, plant cultivation column assembly 100 at some stage of assembly thereof may be placed therein, thereby forming an in-assembly structure thereof to free a user's hands from holding plant cultivation column assembly 100 during such assembly. Such potted base B, and use thereof, may provide the additional benefits of providing a weighted base and constricting mechanism to aid in the assembly of plant cultivation column assembly 100, as well as providing a means to catch any mistakenly dropped planting medium M, potentially averting any waste and/or mess thereof. Since this potentially preferred embodiment of plant cultivation column assembly 100 may offer the feature/benefit of secure, but readily detachable connections via left aperture 121, right aperture 111, left connection means 123, and right connection means 113, connections may form and be removed to ease the construction and filling process and/or avoid damage to plant P or spillage of planting medium M. Additionally, considering that one intent of the use of plant cultivation column assembly 100 may include fostering the natural growth of plant P, as, for example, such leaf L sprout, grow, mature, and molt/die, adjustments may be made by repeating/reversing the above steps. Furthermore, roots of plant P may begin to naturally extend from plant cultivation column assembly 100 and be placed back into plant cultivation column assembly 100, or may be threaded out of and/or between any corresponding left slat 122 and/or right slat 112 via the openings created therefrom. As may be understood by those having skill in the art, such openings formed thereof right slat 112 and left slat 122 may be considered predominant openings, which may allow such leaf L formations to extend and such continuous wall 130 having potentially smaller small aeration pore (right) 131 and small aeration pore (left) 132 (see FIGS. 1-3) may prevent such formations so as to avoid a need to prune, cut, or otherwise remove any leaf L should adjustment/transplantation become desired, warranted, and/or necessary. In other words, the predominant openings of such a potentially preferred embodiment may encourage anatomical plant development outside the structure of plant cultivation column assembly 100 via natural and cultivational processes whereas the smaller openings may prevent and/or inhibit such development from spreading outside the structure of plant cultivation column assembly 100, thus enabling the convenient adjustment of plant P during cultivation and growth of the same.

In an additional potentially preferred embodiment of plant cultivation column assembly 100, sheet 100S may be alternatively constructed in at least the following substitute manner: the plurality of right aperture 111 may be removed such that no hole or aperture is present on the right side of sheet 100S and instead twice as many of left aperture 121 may appear instead, then each of left slat 122 may be removed and placed opposite as right slat 112. In such an embodiment, instead of alternating slats and apertures, all slats may appear on a first side (e.g., left or right) an all apertures on the side opposite (e.g., right or left, respectively). Using such a construction may provide the additional benefit of consuming less plastic during certain manufacture techniques of sheet 100S, and may additionally consume less space when stored flat, for example, during shipping. As may be understood by those persons having ordinary skill in the art, many additional combinations, formations, constructions, and manufactures of sheet 100S may be possible and are intended to be included as objects and techniques of the disclosure.

Figure 5:
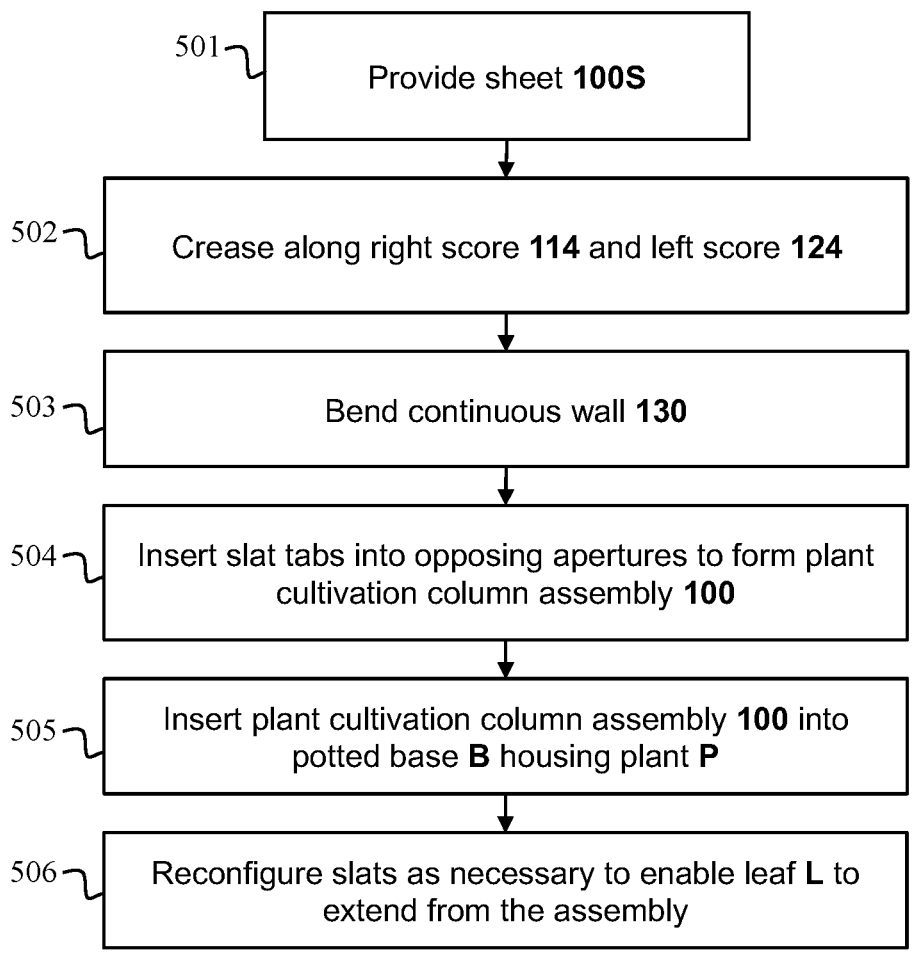
FIG. 5 is a flowchart of a potentially preferred method of use of the assembly and potentially preferred steps for the assembly thereof.

Turning to FIG. 5, therein illustrated is a flowchart of a potentially preferred embodiment of a method of assembly and use of plant cultivation column assembly 100. Starting at step 501, sheet 100S may be provided to a plant cultivator, who may be in possession of a plant, which may be capable of vertical growth through a soil or planting medium. At step 502, sheet 100S may be creased along right score 114 and/or left score 124 to provide the features and/or benefits as may be described supra. Then, continuous wall 130 may be bent and one of right connection means 113 may be inserted into an opposing right aperture 111, then one of left connection means 123 may be inserted into the opposing left aperture 121 via a succession of steps 503-504, which may be conducted in a continuous fashion or through some alternatively ordered combination of such steps 503-504 to form plant cultivation column assembly 100 through such successive steps. Potted base B housing plant P having leaf L may then accept plant cultivation column assembly 100 at step 505, and plant P and planting medium M may be placed therein plant cultivation column assembly 100. Finally, one or more leaf L may be configured through the openings formed among the slats as may be necessary and/or desired and such slats may be reconfigured and reassembled in order to accomplish such configuration at step 506. Various steps in this method may be repeated, omitted, reordered, or otherwise adjusted by those having ordinary skill in the art in order to provide such plant P configuration within plant cultivation column assembly 100 as may be desired by such a skilled artisan.

With respect to the above description then, it is to be realized that the optimum dimensional relationships, to include variations in size, materials, shape, form, position, function and manner of operation, assembly, type and structure of materials, shape, manner of assembly, and type of plant, type of medium, and use(s) thereof, are intended to be encompassed by the present disclosure.

It is contemplated herein, and should be realized by those having ordinary skill in the art, that plant cultivation column assembly 100 of the disclosure (and its methods of use) includes variations in size, shape, construction, manufacture, components, light/water/air source, assembly, the like and/or combinations thereof. Plant cultivation column assembly 100 as herein described may be joined, assembled, constructed, or otherwise linked to additional similar and/or identical plant cultivation column assembly 100 to increase the overall height of the structure formed thereof. Certain connection means may be integrated or installed upon such a structure to prevent the tilting, leaning, and/or collapse or to otherwise enhance the structural integrity of such a tall, narrow structure. Plant cultivation column assembly 100 and the slats of the disclosure may be connected using one or more of many various means, which may preferably include those that may be detachable, including but not limited to buttons, snaps, magnets, hook-and-loop fasteners (e.g., VELCRO®), tape, adhesives, welding(s), zipper(s), the like and/or combinations thereof, and may correspondingly vary in size, structure, and/or assembly. While specific dimensions, shapes, angles, components, materials, folds, slats, apertures, bends, sheets, the like and/or combinations thereof of the disclosed sheet 100S and plant cultivation column assembly 100 thereof may be specifically described herein, the disclosure is not so limited. Plant cultivation column assembly 100 may be recognized by those having skill in the art as having a hollow cylindrical sectional, semi-cylindrical, and/or D-column shape, but plant cultivation column assembly 100 may be further constructed of otherwise configured sheet 100S to enable, induce, or otherwise configure various other column arrangements/shapes which may be known, desired, and/or utilized by those having ordinary skill in the art, and may include but are not limited to a regular cylindrical hollow column shape, a hollow triangular prism column, a B-shaped hollow column shape (when viewed from a top angle via e.g., an inward crease of continuous wall 130), a hollow rectangular prism shape (via, e.g., two creases along continuous wall 130), the like and/or variations and combinations thereof. While a suitable and potentially preferred material of construction of sheet 100S and corresponding plant cultivation column assembly 100 may include a clear plastic sheet (e.g., Polyethylene (PE)) die-cut into the specific arrangement disclosed herein, the disclosure is not so limited and may further include painted, opaque, tinted, translucent or otherwise non-clear PE sheets, as well any number of various suitable materials such as cloths, other woven fabrics, nonwoven fabrics, papers, wood, other natural materials, metals and alloys thereof, meshes, screens, and/or synthetic materials such as composite materials and other plastics as well as combinations and the like. While a preferred method of production of sheet 100S may include production of such a sheet of such various materials and/or their combinations, or perhaps preferably a PE sheet, and machine die-cut shaping of the same, the disclosure is not so limited and may further include hand/knife/blade-cutting of such materials, laser cutting, guillotine cutting, rotary cutting, waterjet cutting, saw cutting, the like and/or combinations thereof. Additionally, certain various materials may be shaped into a vertical block which may then be sliced and scored to meet the various features and benefits herein and are herein described. Certain features and/or benefits of the proposed potentially preferred embodiment of plant cultivation column assembly 100 may exist and be recognized by those having ordinary skill in the art, and may additionally be outlined and discussed in detail herein or may be otherwise apparent from a review of the Drawings and Detailed Description. These may include, but are not limited to the ease of manufacture, transport, assembly and construction and overall simplicity sheet 100S as may be assembled into plant cultivation column assembly 100, additional structural support as may be provided by right score 114 and left score 124 which may provide certain vertical rigidness to plant cultivation column assembly 100, bending curvature which may be provided by continuous wall 130 during the assembly disclosed above which may provide additional vertical rigidness and/or support, redundant opposing slats which may provide a sturdy/ flat face for potentially optimal gas/vapor exchange, top and bottom openings which may further provide the ability to easily and conveniently water and drain plant cultivation column assembly 100, the like, and/or combinations thereof. Additional optional accessories may further enhance such features, benefits, and/or utility, which may be recognized and/or observed by those having ordinary skill in the art. These may include but are not limited to additional vertical supporting structures such as stakes and poles which may be connected or adhered to plant cultivation column assembly 100 or which may be placed into plant cultivation column assembly 100 proximate a side or centrally within plant cultivation column assembly 100, a removable or permanent top, a connection means to potted base B, an openable sleeve to install planting medium M, a time-released fertilizing planting medium M, a moisture retaining additive of planting medium M, the like, combinations thereof, and/or other means, devices, mechanisms, methods, and manufactures to enhance overall plant cultivation as may be known to the relevant skilled artisans. Other uses of the plant cultivation column assembly 100 that involve other uses of plants and/or separate uses altogether may be understood by those skilled in the art and the disclosure is not so limited to include only the disclosed uses as may be detailed herein.

The foregoing description and drawings comprise illustrative embodiments of the present disclosure. Having thus described exemplary embodiments of sheet 100S and plant cultivation column assembly 100 thereof, it should be noted by those ordinarily skilled in the art that the within disclosures are exemplary only, and that various other alternatives, adaptations, and modifications of same may be made within the scope of the present disclosure. Merely listing or numbering the steps of a method in a certain order does not constitute any limitation on the order of the steps of that method. Many modifications and other embodiments of the disclosure will come to mind to one ordinarily skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein, but is limited only by the following claims.

What is claimed is:

1. A plant cultivation column assembly comprising:
   a flexible sheet comprising:
      a rectangular area having a left side and a right side that form a pair of opposing sides;
      a plurality of slats extending from said left side and said right side, said plurality of slats are alternatively spaced in a staggered arrangement along said left side and said right side; and
      a plurality of detachable connection means formed from a first plurality of mechanisms located distally from said rectangular area on each of said plurality of slats and a second plurality of mechanisms located therebetween each of said plurality of slats on each of said pair of opposing sides;
   wherein the plant cultivation column assembly is formed by bending said rectangular area by bringing said left side and said right side proximally toward a center and joining each of said first mechanism of each of said plurality of slats to each opposing said second mechanism therebetween each of said plurality of slats, thereby forming a plurality of predominant openings between said plurality of slats.

2. The assembly of claim 1, wherein each of said first plurality of mechanisms is a widened end of each of said plurality of slats having a first width and each of said second plurality of mechanisms is an aperture having a second width which is lesser than said first width.

3. The assembly of claim 1, wherein said first mechanism and said second mechanism is a detachable connection pair selected from a group of detachable connection pairs, the group of detachable connection pairs consisting of a widened end of each of said plurality of slats having a first width and an aperture having a second width which is lesser than said first width, a hook-and-loop fastener, a button and a hole, a first and a second opposing magnet, and a snap pair.

4. The assembly of claim 1, further comprising a plurality of pores of said rectangular area.

5. The assembly of claim 1, wherein said assembly is constructed of a die cut transparent Polyethylene sheet.

6. The assembly of claim 1, further comprising a scoring pair of said rectangular area, wherein said scoring pair is proximally from and parallel to each of said left side and said right side.

7. The assembly of claim 6, wherein said scoring pair upon a folding thereof forms a left connection side and a right connection side and said second plurality of mechanisms are displaced along said left connection side and said right connection side.

8. The assembly of claim 7, wherein said assembly is installed into a potted base.

9. A method of cultivation of a plant comprising:
   providing a flexible sheet comprising a rectangular area having a left side and a right side that form a pair of opposing sides, a plurality of slats extending from said left side and said right side, said plurality of slats being alternatively spaced in a staggered arrangement along said left side and said right side, and a plurality of detachable connection means formed from a first plurality of mechanisms located distally from said rectangular area on each of said plurality of slats and a second plurality of mechanisms located therebetween each of said plurality of slats on each of said pair of opposing sides;
   bending said rectangular area of said flexible sheet by bringing said left side and said right side proximally toward a center; and
   joining each of said first mechanisms of each of said plurality of slats to each opposing of said plurality of second mechanisms therebetween each of said plurality of slats to form a plant cultivation column assembly having an open top, an open bottom, and a plurality of predominant openings therebetween said plurality of slats.

10. The method of claim 9, further comprising providing a potted base having a first amount of planting medium and inserting the plant into the planting medium.

11. The method of claim 10, further comprising inserting said plant cultivation column assembly therein said potted base at said bottom opening, the plant predominantly within said plant cultivation column assembly.

12. The method of claim 11, further comprising threading an at least one leaf through at least one of said plurality of predominant openings of said plant cultivation column assembly.

13. The method of claim 12, wherein an at least one of said detachable connection means are detached prior to threading said at least one leaf and reattached subsequent to threading.

14. The method of claim 12, further comprising adjusting the detachable connection means by selectively detaching and subsequently reattaching the first plurality of mechanisms to the second plurality of mechanisms to modify an arrangement of the plant.

15. The method of claim 14, further comprising providing care, maintenance, and monitoring of the plant within said plant cultivation column assembly.

16. A method of claim 9, wherein said flexible sheet is constructed of a die cut transparent Polyethylene sheet.

17. The method of claim 9, wherein the flexible sheet further comprises a scoring pair of said rectangular area, wherein said scoring pair is proximally from and parallel to each of said left side and said right side.

18. A plant cultivation column assembly comprising:
   a flexible sheet comprising:
      a rectangular area having a left side and a right side that form a pair of opposing sides;
      a plurality of slats extending from at least one of said left side and said right side; and
      a plurality of detachable connection means formed from a first plurality of mechanisms located distally from said rectangular area on each of said plurality of slats and a second plurality of mechanisms on said rectangular area opposite said plurality of slats;

wherein the plant cultivation column assembly is formed by bending said rectangular area by bringing said left side and said right side proximally toward a center and joining each of said first mechanism of each of said plurality of slats to each opposing said second mechanism, thereby forming a plurality of predominant openings between said plurality of slats.

\* \* \* \* \*